United States Patent [19]
Hotta et al.
[11] 4,178,508
[45] Dec. 11, 1979

[54] DEVICE FOR CONTROLLING AMOUNT OF X-RAY IRRADIATION

[75] Inventors: Toshihiro Hotta, Yashiki; Takao Makino, Hikone, both of Japan

[73] Assignee: Kabushiki Kaisha Morita Seisakusho, Kyoto, Japan

[21] Appl. No.: 928,057

[22] Filed: Jul. 26, 1978

[30] Foreign Application Priority Data

Jul. 30, 1977 [JP] Japan ................................ 52-91793
May 11, 1978 [JP] Japan ................................ 53-56244

[51] Int. Cl.$^2$ ................................ G01J 1/42
[52] U.S. Cl. ................................ 250/355; 250/413
[58] Field of Search ............... 250/322, 355, 408, 415, 250/421, 409, 401, 402, 413

[56] References Cited

U.S. PATENT DOCUMENTS

| | | | |
|---|---|---|---|
| 3,906,233 | 9/1975 | Vogel | 250/355 |
| 3,916,251 | 10/1975 | Hernandez et al. | 250/421 |
| 4,053,774 | 10/1977 | Berdahl | 250/355 |

*Primary Examiner*—Paul L. Gensler
*Assistant Examiner*—T. N. Grigsby
*Attorney, Agent, or Firm*—Koda and Androlia

[57] ABSTRACT

A device for controlling the amount of X-ray irradiation in an X-ray photographing apparatus wherein the dose of X-rays actually administered from an X-ray tube to a patient is determined or measured in an X-ray irradiation amount measuring circuit. The measured value is compared with a set point of X-ray irradiation amount. When the measured value is in agreement with the set point, the operation of the X-ray tube is inactivated.

7 Claims, 3 Drawing Figures

DEVICE FOR CONTROLLING AMOUNT OF X-RAY IRRADIATION

BACKGROUND OF THE INVENTION

1. Field of the Invention

This invention relates to devices for controlling the amount of X-ray irradiation in X-ray photographing for medical diagnosis, and in particular relates to X-ray photographing for dental diagnosis.

2. Prior Art

Generally, an X-ray photographing apparatus for stomatic use in dental treatment is placed under a restraint under which a photograph is taken by inserting a film into the mouth of a patient. Accordingly, the amount of X-ray irradiation is indirectly controlled by regulating the voltage and current of an X-ray tube and a period of time of irradiation. Accordingly, the result is that there is a tendency that fluctuation in the voltage and the like of the X-ray tubes cause variation in the amount of radiation. Accordingly, repetition of photographing due to too large or too small an amount of radiation exposure of the film exposes a patient to overdoses of X-rays and makes it difficult to take X-ray photographs of the same quality.

SUMMARY OF THE INVENTION

Accordingly, it is a general object of the present invention to provide an X-ray apparatus wherein the quality of the X-ray pictures are consistant.

It is another object of the present invention to provide an X-ray apparatus which does not expose the patient to overdoses of irradiation.

In keeping with the principles of the present invention, the objects are accomplished by a unique device for controlling the amount of X-ray irradiation in an X-ray photographing apparatus. The device for controlling the amount of X-ray irradiation includes a irradiation amount measuring circuit which measures or determines actual amount of X-rays administered from an X-ray tube to a patient, a means for comparing the measured value with a set point of X-ray irradiation amount and a means for inactivating the operation of the X-ray tube when the measured value is in agreement with the set point.

BRIEF DESCRIPTION OF THE DRAWINGS

The above-mentioned features and objects of the present invention will become more apparent with reference to the following description taken in conjunction with the accompanying drawings wherein like reference numerals denote like elements, and in which.

DETAILED DESCRIPTION OF THE INVENTION

Figure 1:
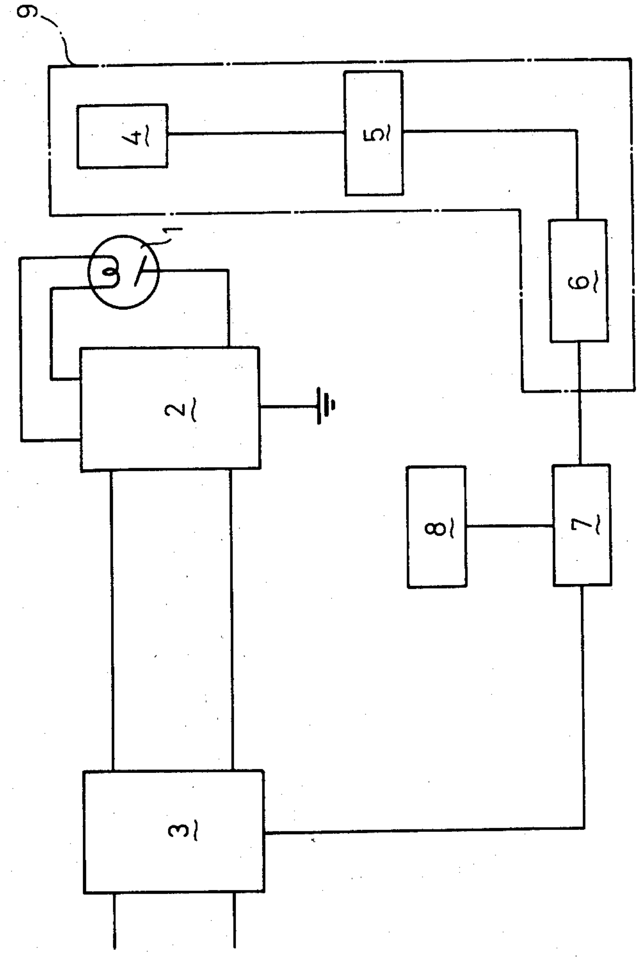
FIG. 1 is a block diagram showing one embodiment of a device for controlling the amount of X-ray irradiation in accordance with the teachings of the present invention.

Referring more particularly to the drawings, shown in FIG. 1 is one embodiment in accordance with teachings of the present invention. In FIG. 1 the apparatus includes an X-ray tube 1 connected to the secondary side of a high-voltage transformer 2 and a main control circuit 3 is connected to the primary side of the high-voltage transformer 2. The control circuit 3 is for the function of turning on and turning off power for applying preheating voltage and power for supplying tube voltage for the X-ray tube 1 to the high-voltage transformer 2. A circuit for measuring the amount of X-ray irradiation 9 is provided opposite the X-ray tube 1 and includes an irradiation measuring circuit 4 which itself includes a pre-amplification circuit, an amplification circuit 5 and an integration circuit 6. The output of the irradiation measuring circuit 9 is supplied to a comparison circuit 7 and another input of the comparison circuit 7 is coupled to an X-ray irradiation setting circuit 8. The circuit 3 through 8 constitutes a feedback loop.

In operation, when the X-ray tube 1 is energized and X-rays are irradiated upon a patient, the amount of X-rays irradiated is measured by the X-ray amount measuring circuit 4 disposed in the irradiation locus of the X-rays and is converted into an electrical output. The electrical output is amplified in the amplification circuit 5 and thereafter integrated in the integration circuit 6 and inputted to the comparison circuit 7. Since the value of the amount of X-ray irradiation set by the X-ray irradiation setting circuit 8 is inputted to the comparison circuit 7, both the integrated and the set point of the setting circuit are compared in the comparison circuit 7. When the integrated value is in agreement with the set point of the amount of X-rays to be irradiated, a feedback signal (a signal for making the X-ray tube in an operative or inoperative) is inputted to the main controller 3 and energization of the primary side of the high-voltage transformer 2 is stopped.

In this manner, the amount of X-rays actually irradiated is measured in the X-ray irradiation measuring circuit 9 and the amount measured is compared with the X-ray irradiation amount setting point; and when both the measured amount value and the set point value are in agreement, the supply of current to the primary side of the high-voltage transformer circuit 2 is stopped. Accordingly, only a correct amount of X-rays can be irradiated to thereby not only provide a desired X-ray photograph at one shot of photographing but also greatly reduce a does of X-ray to which a patient is exposed. Also, in the present invention, a change in the tube voltage by fluctuations in the voltage of the power cannot affect the correct amount of X-rays to be irradiated.

Figure 2:
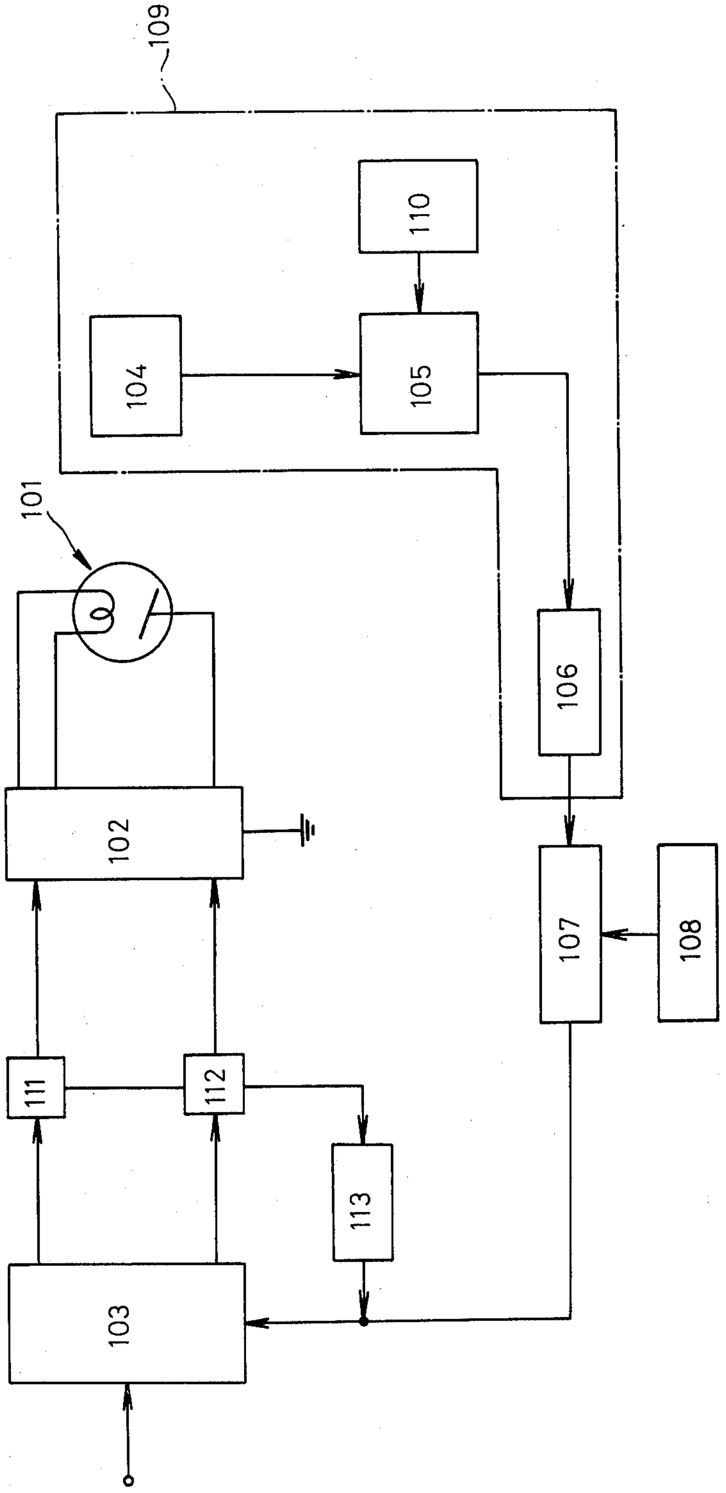
FIG. 2 is a block diagram illustrating another embodiment of a device for controlling the amount of X-ray irradiation in accordance with the teachings of the present invention.

In FIG. 2 showing another embodiment of the present invention, the numeral 101 designates an X-ray tube; 102 a high-voltage transformer circuit; 103 a main control cicuit; 104 an X-ray irradiation amount measuring circuit; 105 an amplification circuit; 106 an integration circuit; 107 a comparison circuit; 108 an X-ray irradiation setting circuit; 109 an X-ray irradiation amount measuring circuit; 110 an amplification factor setting circuit for selectively setting an amplification factor of the amplification circuit 105; 111 a preheating timer for an X-ray tube filament (heater); 112 a zero cross circuit; and 113 designates a timer for backing up the series of circuits mentioned above.

For a better understanding of the description that follows of FIG. 3 in which the circuitry of FIG. 2 is embodied, a detailed description will be given of the operation of FIG. 2 circuitry. When X-ray photographing is started, the amplification factor of the amplification circuit 105 is established in the amplification setting circuit 110 depending upon the sensitivity of a film to be used, the affected part to be photographed of a film to be used, the affected part of a patient, and the characteristics of each patient, as a preliminary procedure for X-ray photographing, and also the value of amount of X-ray irradiation is set in the X-ray irradiation setting circuit 108. Thereafter, when a start switch to be later described is pressed, preheating voltage is applied from the high-voltage transformer circuit 102 through the preheating timer circuit 111 exclusively to the filament of the X-ray tube 101, whereby the X-ray tube 101 is activated ready for photographing. After a lapse of the preheating time preselected by the preheating timer 111, a signal for starting irradiation is inputted from the main control circuit 103 through the zero cross circuit 112 and the high voltage on the secondary side of the high-voltage transformer 102 is applied to the X-ray tube 101 as tube voltage to thereby start X-ray photographing. At the same time, the backup timer 113 is started. When X-rays begins to be irradiated from the X-ray tube 101, the amount of X-rays irradiated is measured in the X-ray amount measuring circuit 104 and is converted into electric output. The output is amplified in the amplification circuit 105 and thereafter integrated in the integration circuit 106 and inputted to the comparison circuit 107. Because the value of amount of X-ray irradiation is inputted from the X-ray irradiation amount setting circuit 108 to that comparison circuit 107, comparison is made of the two values in the comparison circuit 107. When the integrated value and the set point of X-ray irradiation amount are in agreement by continuation of the X-ray irradiation, a feedback signal (a signal for making the X-ray tube operative or inoperative) is given to the main control circuit 103 and energization of the primary side of the high-voltage transformer circuit 102 is stopped. When the feedback signal from the comparison circuit 107 is not inputted to the main circuit 103 because of certain trouble despite the fact that the integrated value and the X-ray irradiation amount set point are in agreement, the backup timer 113 functions to stop operation of the X-ray tube 101 by applying a stop signal, in place of the feedback signal, to the main control circuit 103.

Figure 3:
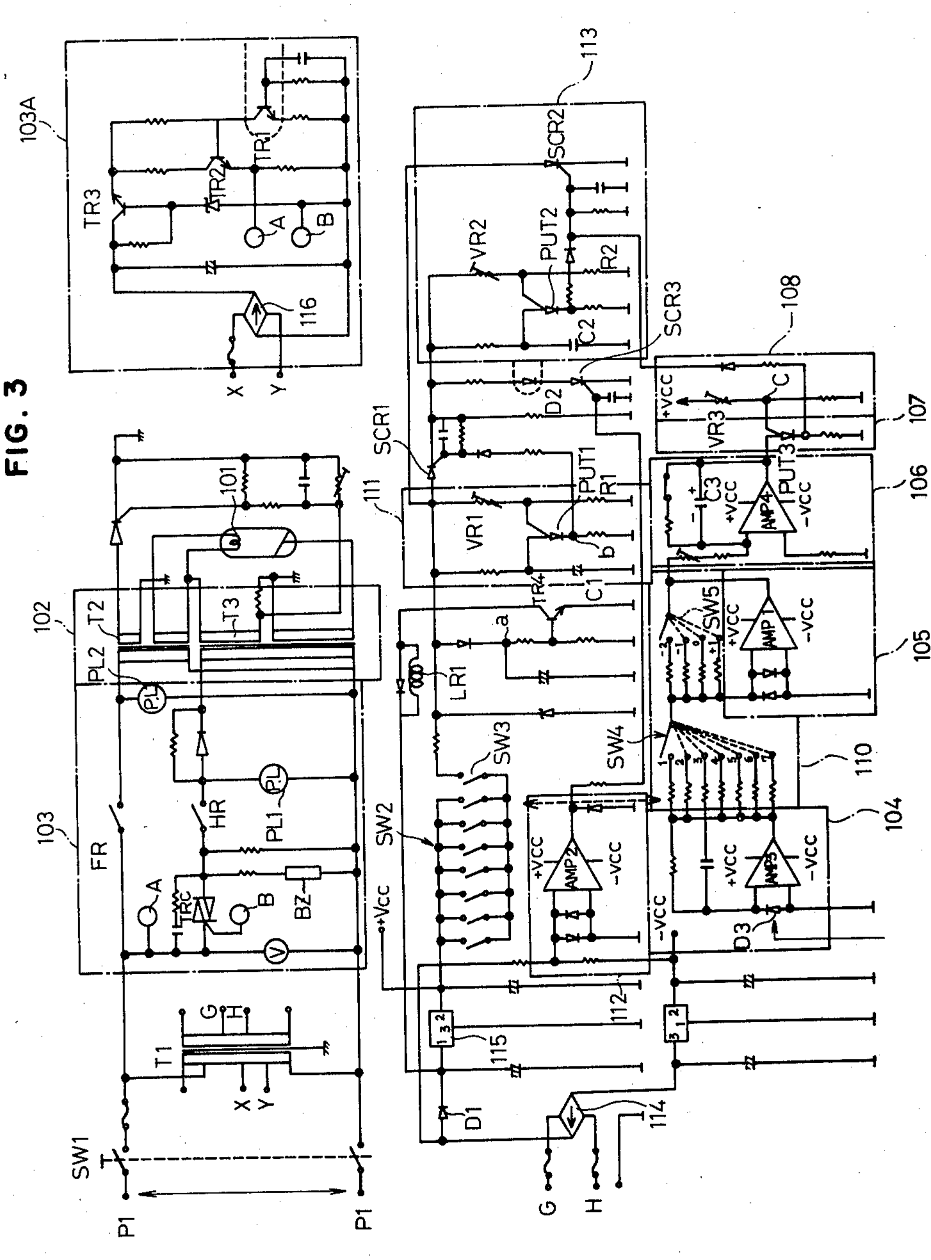
FIG. 3 is an electric circuit incorporating the embodiment of FIG. 2.

FIG. 3 is an electric circuit in which the block diagram of FIG. 2 is embodied. The reference characters P1 and P1 in this circuit designate input terminals for the main control circuit 103, and when power is switched on and a main switch SW1 is closed as a preliminary procedure for X-ray photographing, power is applied to a power transformer T1 to thereby produce secondary voltage in the secondary side terminals X, Y and G, H of the transformer T1. The terminals X and Y are the same as the terminals X and Y for the circuit 103A in the main control circuit 103 shown in a separate diagram on the upper right end of FIG. 3, to which circuit 103 is applied voltage. But because transistors TR1–TR3 are not energized with an electric current, no output voltage is produced in the high-voltage terminals A and B. Accordingly, because high-voltage terminals A and B of the same reference characters in the main control circuit also have no input and do not trigger two-way three-terminal control rectifier element (TRIAC) TRC, tube voltage is not applied to the X-ray tube 101. On the other hand, the output from terminals G and H on the secondary side of the transformer T1 is rectified (into a pulsating current) in full wave rectification circuit 114 and a direct current portion of the pulsating current is supplied through a diode D1 to the relay LR1 side. On the other hand, the pulsating current is smoothened in a stablilizing voltage circuit 115 and thereafter it is inputted to an amplification factor selecting switch group SW2. This switch group SW2 is linked with a switch group SW4 in the amplification factor setting circuit 110, and the amplification factor of an amplifier AMP1 is varied by suitably selectively closing contact pieces in the switch groups SW2 and SW4. This operation for varying the amplification factor is performed for the purpose of obtaining a maximum image in accordance with the position of the affected part to be photographed. Also, a switch group SW5 in the amplification factor setting circuit 110 functions to change the factor of the amplifier AMP1 likewise by the characteristics of the patient (for example, difference between grown-ups and children), and an input signal level of integration circuit 106 in the next step can be varied by selection of the contact pieces in the switch groups SW4 and SW5. This selective changeover of switch groups SW4 and SE5 is included in the step of the preliminary procedure of photographing, and unless after the procedure, the apparatus is designed not to operate. Also, the direct current portion of the pulsating current that passes through the full wave rectification circuit 114 enters the zero cross circuit 112 without being stabilized but as a pulsating current. The operation of this zero cross circuit 112 will later be described. It was earlier described that the direct current portion flowed to the relay LR1, but the relay LR1 is not excited because the transistor TR4 in the rear step is not energized by the start switch SW3 with a current. Furthermore, in the comparator 107, the voltage at point C (corresponding to the X-ray irradiation amount setting point) is set by a variable resistor VR3.

A description will now be given of the operation of circuit. When the start switch SW3 is turned on, the transistor TR4 is on. Then, a relay LR1 is operated, and relay switches FR and HR are closed and filament voltage is applied through a filament transformer T2 in the high-voltage transformer circuit 102 to the heater for the X-ray tube 101. But because at this point of time a two-way three-terminal control rectifier TRC has not been triggered, tube voltage is not applied. In short, only preheating by heater is effected.

When the start switch SW3 is closed, a preheating timer circuit 111 is energized. After a certain period of time from the point of time at which this energization is started (preheating is started) to a certain preheating time which depends upon the time constant of a condenser C1 and the potential ratio of resistor R1 to variable resistor VR1, inversion preventing three-terminal control rectifying element PUT1 is on and a silicon controlled rectifier element SCR1 is triggered and an X-ray tube operation time setting timer 113 is energized. After a certain period of time from after this energization, which period of time depends upon a condenser C2, variable resistor VR2, and resistor R2, the inversion preventing three-terminal control rectifying element PUT2 is energized, the silicon controlled rectifier element SCR2 is energized to thereby inversely bias the silicon controlled rectifier element SCR1. But at the point of time at which the silicon controlled rectifier element SCR1 was energized previously, forward voltage is applied to a coupling diode D2 as a photo coupler, and transistor TR1 of circuit 103A is biased to its base to thereby energize transistors TR1 to TR3. Accordingly, that direct current portion of a current which was rectified by the current having passed through input terminals S, Y and through a full wave rectification circuit 116 is produced as output at output terminals A and B, and two-way three-terminal control rectifying element TRC is triggered by the terminal output. Along with the energization of this element TRC, alternating current voltage is applied to a high-voltage transformer T3 in the high-voltage transformer circuit 102 and tube voltage is applied to the X-ray tube 101 connected to the secondary side of this high-voltage transformer T3 and thus the X-ray tube 101 starts irradiating X-rays.

Since the relay switch HR is closed, buzzer BZ and pilot lamp PL1 are energized, with the result that actuation (starting of photographing) of the apparatus of the invention is visually reported by the buzzer and light signal of the elements BZ and PL1.

A clock pulse (gate signal) from the zero cross circuit 112 is outputted at certain time intervals to the gate of the silicon controlled rectifier element SCR3 connected series to the coupling diode D2. In short, the above signal is outputted to the zero cross circuit 112 to thereby trigger the silicone controlled rectifier element SCR3. Accordingly, the coupling diode D2 also is energized only during an ON-period of the element SCR3 and controls the transistor TR1 to TR3 to produce an output current at the output terminals A and B. This output triggers the two-way three-terminal control rectifying element TRC, and the tube voltage in the X-ray tube 101 is correctly applied from the zero level of voltage, and there is no disadvantage of high voltage being suddenly applied. Accordingly, the diode D2 and transistor TR1 constitute an arcuate circuit.

When the irradiation of X-rays is started, the X-rays (light signal) enters a photo diode D3 and is converted into photoelectric current and the current thus generated is inputted to a pre-amplifier AMP3, and then from an amplification circuit 105 to an integration circuit 106. Concretely stated, the output amplified by an amplifier AMP1 to a required factor is inputted to the integration circuit 106 in the next step, and then well-known integration is operated by a condenser C3 and an amplifier AMP4. Since in the comparator 107 to which this integrated output is inputed the preset voltage is set at point C, agreement of this preset voltage with the integrated voltage energizes an inversion preventing three-terminal control rectifying element PUT3 and, as stated, the silicon controlled rectifying element SCR2 of backup timer 113 is triggered to bias the element SCR1 inversely and, upon stopping energization of diode D2, the operation of the X-ray tube 101 is simultaneously deactuated. When output is not produced at point C because of some trouble or other with circuits 104 to 106 despite the fact that the preselected amount of X-rays is already irradiated, the aforestated element PUT2 is energized to thereby bias the element SCR1 inversely, with the result that a patient is protected against excessive exposure of X-rays. The whole circuit operation ends in the above.

The relay switch HR functions as a safety switch, and when the element TRC has broken down, application of high-voltage to the X-ray tube 101 is interrupted by this relay switch HR. At this time, the pilot lamp PL1 is not lit but the buzzer BZ continues sounding, and an operation different from normal operation of the two elements PL1 and BZ warns the user of anything unusual. Accordingly, the relay LR; may be called a backup relay. And a pilot lamp PL2 is used for notifying of a filament preheating power source being on.

It should be apparent to those skilled in the art that the above described embodiments are merely illustrative of but one of the many possible specific embodiments which represents the application of the principles of the present invention. Numerous and varied other arrangements can readily be devised by those skilled in the art without departing from the spirit and scope of the invention.

We claim:

1. A device for controlling an amount of X-ray irradiation in an X-ray apparatus having an X-ray tube, said device comprising:
   - a high-voltage transformer circuit having a primary side and a secondary side, said secondary side being connected to said X-ray tube;
   - a main control circuit for supplying preheating voltage to said X-ray tube and for applying tube voltage to said X-ray tube via said primary side of said high-voltage circuit;
   - an X-ray irradiation amount measuring circuit for measuring the amount of X-rays irradiated from said X-ray tube and for integrating the amount measured;
   - an X-ray irradiation amount setting circuit for presetting an amount of X-rays to be irradiated; and
   - a comparison circuit for comparing the integrated measured value from said X-ray irradiation amount measuring circuit with said preset amount of X-ray irradiation from said X-ray irradiation amount setting circuit and for generating an X-ray tube operation deactuating signal to said main control circuit when both said integrated value and said preset amount are in agreement with each other whereby when the measured amount of irradiation is equal to the preset amount, said X-ray tube is inactivated by said main control circuit.

2. A device for controlling an amount of X-ray irradiation in an X-ray apparatus having an X-ray tube, said device comprising:
   - a high-voltage transformer circuit, said high-voltage transformer circuit having a primary side and a secondary side, said secondary side being connected to said X-ray tube;
   - a main control circuit for applying preheating voltage to said X-ray tube and for applying tube voltage to said X-ray tube via said primary side of said high-voltage circuit;
   - a preheating timer for setting the preheating time of said X-ray tube and for applying said tube voltage from said power of control circuit to said primary side of said high-voltage transformer circuit after a lapse of a predetermined time;
   - a zero cross circuit for bringing a point of time for applying tube voltage to said X-ray tube into agreement with the zero level of applied alternating current power to said high-voltage transformer circuit;
   - an X-ray tube operation time setting timer for setting a maximum operation time of said X-ray tube and generating an X-ray tube operation deactuating signal to said main control circuit after a lapse of said maximum operating time;
   - an X-ray irradiation amount measuring circuit for measuring the amount of X-rays irradiated from said X-ray tube and integrating said measured output;

an X-ray irradiation amount setting circuit for presetting an amount of X-rays to be irradiated; and a comparison circuit for comparing said set amount of X-rays to be irradiated in said X-ray irradiation amount setting circuit with said integrated value from said X-ray irradiation amount measuring circuit and for generating an X-ray tube operation deactivating signal to said main control circuit when said integrated value and said preset amount of X-rays are in agreement with each other, whereby said X-ray tube is deactuated by said main control circuit when said integrated measured amount of X-ray irradiation is equal to said preset amount.

3. A device for controlling an amount of X-ray irradiation accoriding to claims 1 or 2 wherein said X-ray irradiation amount setting circuit comprises an X-ray amount measuring circuit, an amplification circuit for amplifying the output of said X-ray amount measuring circuit and an integration circuit for integrating the output of said amplification circuit.

4. A device for controlling an amount of X-ray irradiation according to claim 3 wherein said amplification circuit of said X-ray irradiation measuring circuit has a variable amplification factor.

5. An X-ray irradiation amount controlling circuit according to claim 2 wherein said X-ray tube operation time setting timer is set by a preheating terminating signal of said preheating timer and the X-ray irradiation amount measuring circuit inputs an X-ray tube operation deactivating signal to the main control circuit only when said X-ray irradiation amount measuring circuit does not output the integrated output for more than a specified period of time.

6. A device for controlling an amount of X-ray irradiation according to claim 4 wherein said variable amplification of said amplification circuit is selectively set by an amplification factor setting circuit.

7. A device for controlling an amount of X-ray irradiation according to claim 6 wherein said X-ray tube operation time setting timer comprises a timer circuit which begins timing when said X-ray tube begins operation and which sends out an operation deactuation signal to said main control circuit after said maximum time period of operation has elapsed.

* * * * *